United States Patent
Peters et al.

(10) Patent No.: US 7,529,462 B2
(45) Date of Patent: May 5, 2009

(54) MEMORY CONTROL METHOD FOR A PERSONAL VIDEO RECORDING SYSTEM

(75) Inventors: Marc Andre Peters, Eindhoven (NL); Wilhelmus Henrica Gerarda Maria Van Den Boomen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1209 days.

(21) Appl. No.: 10/101,788

(22) Filed: Mar. 20, 2002

(65) Prior Publication Data

US 2002/0138838 A1 Sep. 26, 2002

(30) Foreign Application Priority Data

Mar. 22, 2001 (EP) ................................. 01201073

(51) Int. Cl.
*H04N 5/91* (2006.01)
*H04N 7/00* (2006.01)

(52) U.S. Cl. .................. 386/46; 386/83; 369/13.16; 369/13.25; 360/57; 725/58

(58) Field of Classification Search ............... 386/46, 386/83; 725/58; 369/13.16, 13.25; 360/57
See application file for complete search history.

(56) References Cited

U.S. PATENT DOCUMENTS

| 5,635,989 A | * | 6/1997 | Rothmuller | 725/46 |
| 6,760,535 B1 | * | 7/2004 | Orr | 386/46 |
| 6,801,918 B1 | * | 10/2004 | Mizuno | 707/200 |
| 2003/0118323 A1 | * | 6/2003 | Ismail et al. | 386/83 |
| 2004/0216160 A1 | * | 10/2004 | Lemmons et al. | 725/46 |
| 2006/0140584 A1 | * | 6/2006 | Ellis et al. | 386/83 |
| 2007/0127887 A1 | * | 6/2007 | Yap et al. | 386/95 |

* cited by examiner

*Primary Examiner*—Thai Tran
*Assistant Examiner*—Girumsew Wendmagegn

(57) ABSTRACT

The invention relates to a PVR system (100) making choices to store or remove certain programs in or from a memory (102) in order to create space for new programs to be stored in the memory. The choices are arranged in a list (201) of programs to be stored and a list (211) of programs to be erased from the memory. After these lists have been generated by the system (100), they are presented to the user for the purpose of confirmation and possible modifications. In this way, the user is aware of the choices made by the system and the method according to the invention enables him to confirm multiple choices by the system in one action. An operating device (104) is provided with a key (301) which is specifically intended to confirm choices made by the system (100).

7 Claims, 1 Drawing Sheet

MEMORY CONTROL METHOD FOR A PERSONAL VIDEO RECORDING SYSTEM

Figure 1:
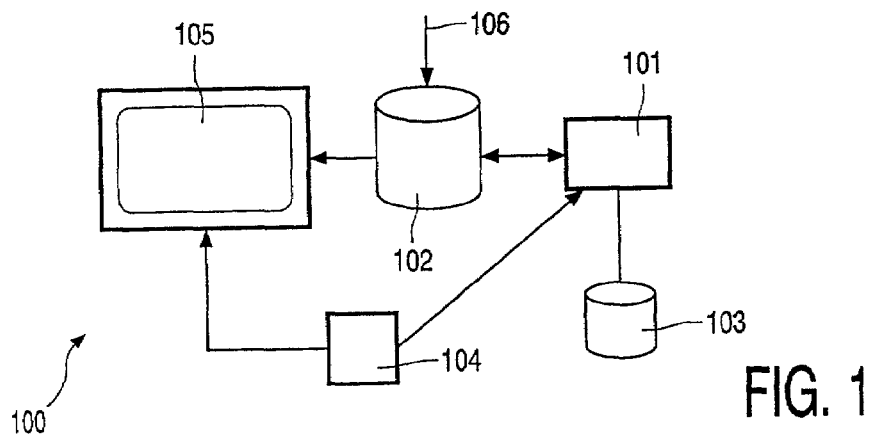

The invention relates to a memory control method for a system which is adapted to store audiovisual information in a memory, in which programs with audiovisual information are selected and selected programs are automatically stored in the memory, and, in case of lack of space, programs stored in the memory are further selected and the further selected programs are erased so as to create space for new programs to be stored, and in which furthermore a first list of selected programs to be stored in the memory and a second list of further selected programs to be erased from the memory are generated.

The invention also relates to an apparatus for operating a system adapted to store audiovisual information in a memory.

An embodiment of such a method is known from WO 92/229893.

In personal video recorder (PVR) systems, certain programs are stored in a memory on the basis of knowledge, present in the system, of the user's preference. The user may have entered this preference into the system himself by selecting certain programs for storage in the memory. However, it is alternatively possible that the system keeps track of the user's behavior and thus gains knowledge about the user's preference for certain programs. Based on this information, the PVR system itself can select programs for storage in the memory. In a PVR, these programs can be stored on an optical disc, a hard disc drive or another type of memory incorporated in the system.

When the memory gets full, programs must be erased to reserve space in the memory for new programs to be stored. The PVR system may select programs stored in the memory for removal from the memory on the basis of different criteria. These criteria may be criteria indicated by the user himself, for example, these programs can be erased, the user has already seen the programs, the user has informed the system that he is not interested in programs, the oldest program must be erased from the memory (FIFO system) or other criteria.

If the system itself selects the programs to be stored in and erased from the memory, this may lead to the user's disappointment. The user's preference may have been modified or the system may have insufficient knowledge about the user. As a result, programs that the user likes to have in the memory are not stored in the memory. It may also happen that the user still wants to keep programs which are selected to be erased.

It is an object of the invention to provide a more user-friendly system adapted to store audiovisual information in a memory.

According to the invention, this object is achieved in that after each decision by the system to add at least a program to a first list with selected programs to be stored in the memory, the first list is displayed on a display device for confirmation by a user, and in that after each decision by the system to add at least a program to a second list with selected programs to be erased from the memory, the second list is displayed on a display device for confirmation by a user.

Programs to be stored in or erased from the memory may be selected, for example, after a period of several days or once a week. The user is informed about the selection after the system has selected the programs, for example, when the user switches on the system for the first time after the selection.

The invention has the advantage that the system is very user-friendly because the user accepts the confirmation of the list, the selections of the PVR system for storage of programs in and removal of programs from the memory all at the same time in a passive action instead of having to do this for each program. An additional advantage is that the user confirms several choices of the system by means of an action.

It is also possible that the system enables the user to modify the first and/or second list before confirming this list. This has the advantage that the user is given the opportunity to modify choices made by the system if the user does not agree on these choices.

The apparatus according to the invention is characterized in that the apparatus is provided with a key to enable the user to confirm choices made by the system. In this way, the user has a specific key available for confirming choices by the system and he no longer needs to wonder which generic key has this function if choices made by the system are to be confirmed.

These and other aspects of the invention are apparent from and will be elucidated with reference to the embodiments described hereinafter.

Figures 2A, 2B:
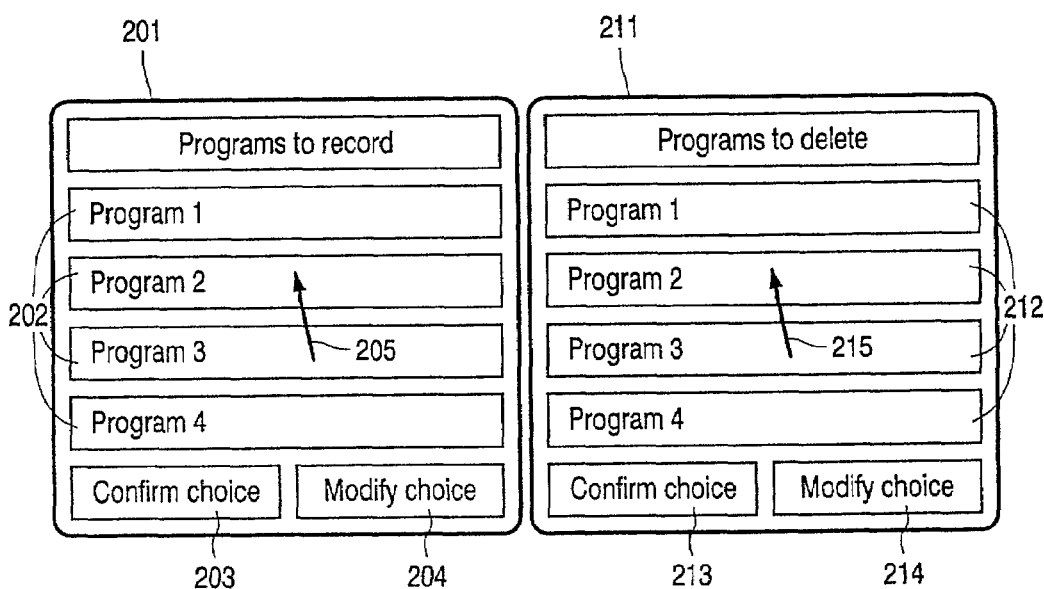
Figure 3:
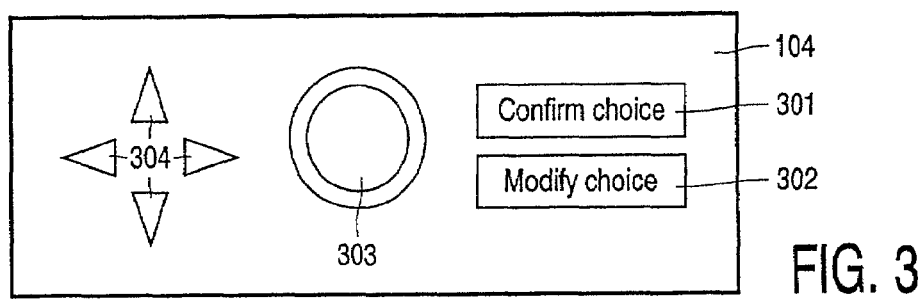

In the drawings:

FIG. 1 is a block diagram of an embodiment of a PVR system according to the invention, FIG. 2A shows a possibility of displaying a list of programs to be recorded, FIG. 2B shows a possibility of displaying a list of programs to be deleted, FIG. 3 shows a possible operating panel of a possible PVR system.

A possible implementation of the invention will be described with reference to the drawing. FIG. 1 shows a PVR system which is illustrative of the implementation of the invention. This system comprises a processing unit 101, a first memory 102 for storing audiovisual data, a second memory 103 for information about the user's preferences for certain programs, an operating panel 104 and a display screen 105. FIG. 3 shows the operating panel 104 in greater detail. It will be elucidated below.

The system 100 in FIG. 1 preferably generates a list of programs at the start of a period of several days, which programs will be transmitted in the coming period and can be received by the system via a connection 106. This selection can take place on the basis of the user's preference, which preference is stored in the second memory 103 in the implementation of a PVR system as shown in the Figure. However, this information may be alternatively available in the first memory 102. This information may be based on the user's behavior in the past, which information is processed by the processing unit 101, but the user may also select specific programs by means of the operating panel 104 for storage in the first memory 102. The programs selected for storage in the first memory 102 are arranged in a list which is stored in the second memory 103. However, this information may be alternatively stored in the first memory 102.

If the first memory 102 appears to have too little space, the processing unit 101 selects programs to be erased from the first memory 102. This may be effected on the basis of knowledge about the user's preference, which is stored in the second memory 103 in the implementation shown, on the basis of a FIFO algorithm, according to which the oldest programs are erased from the first memory, on the basis of knowledge whether the user has already watched the program, stored in the second memory 103, or on the basis of at least another criterion. The programs selected for removal from the first memory 102 are arranged in a list which is stored in memory 103.

There may be the problem that the contents of the generated lists do not correspond to the user's wishes, in spite of the fact that the lists have been generated on the basis of knowledge about the user's preference. According to the invention, the previously mentioned lists are therefore presented to the user after they have been generated by the system 100. This takes place at the instant when the user switches on the system 100 for the first time after the system has generated a new list of programs to be stored in the first memory 102 and, if necessary, has generated a new list of programs to be erased from the first memory.

The list of programs to be stored can be presented on the display screen 105 (FIG. 1) in the way as is shown in FIG. 2A. A first list 201 of programs selected for storage in the first memory 102 is shown to the user. The user is given the opportunity to confirm this first list 201 if he agrees on the selection of programs to be stored in the first memory 102 and as generated by the system 100. Confirmation may be given by pressing a key 301 on the operating panel 104 (see FIG. 3). However, the operating panel 104 may alternatively comprise a different actuator enabling the user to confirm choices made by the system 100. However, it is also possible to show a pointer 205 on the screen 105 and a key 203 underneath the list of selected programs 202, to which the user can direct the pointer by using operating panel 104 in FIG. 3 and can select the key for confirmation. This is possible by providing said operating panel with, for example, a trackball 303 or cursor keys 304.

If the user does not agree on the selection of programs to be stored in the memory and generated by the system 100 (FIG. 1), the user can first modify the presented first list 201 before he confirms the first list by means of the method described hereinbefore. The user is given the opportunity to indicate that he wants to modify the first list by pressing the key 302 on the operating panel 104 or by directing the pointer 205 on the screen 105 by means of the cursor keys 304 or the trackball 303 on the operating panel 104 to the key 204 and selecting this key. Subsequently, the user may modify the presented first list by entering correct or extra data into the system by means of keys on the operating panel 104 (not shown).

These methods of confirming the first list 201 of programs to be stored in the memory and of modifying and subsequently confirming this list may be used in a corresponding manner for confirming or modifying and confirming a second list 211 of programs to be erased from the memory. The reference numerals in FIG. 2B correspond to those in FIG. 2A, be it that they have been incremented by 10.

The invention claimed is:

1. A memory control method for a system which is adapted to store audiovisual information in a memory, in which programs with audiovisual information are selected and selected programs are automatically stored in the memory, and, in case of lack of space, programs stored in the memory are further selected and the further selected programs are erased so as to create space for new programs to be stored, and in which furthermore a first list of selected programs to be stored in the memory and a second list of further selected programs to be erased from the memory are generated, characterized in that the method comprises the steps of:

automatically displaying the first list on a display device for confirmation by the user after each decision by the system (100) to add at least a program to the first list; and automatically displaying the second list on a display device for confirmation by the user after each decision by the system (100) to add at least a program to the second list.

2. The method as claimed in claim 1, characterized in that the method further comprises the step of:

giving the user the opportunity to modify the displayed list, upon presentation of a list to the user for the purpose of confirmation, by way of entry means before the user confirms the list.

3. The method as claimed in claim 1, characterized in that the first and the second list are generated on the basis of knowledge, present in the system, about the user's preference for certain programs.

4. An apparatus comprising:

a memory for storing audiovisual information;

a system for storing audiovisual information in the memory; and a processing unit for selecting programs with audiovisual information and for storing selected programs in the memory, for further selecting programs stored in the memory in the case of lack of space and erasing further selected programs so as to create space for new programs to be stored, said processing device:

generating a first list of selected programs to be stored in the memory and a second list of further selected programs to be erased from the memory;

automatically displaying the first list on a display device for confirmation by a user after each decision by the system to add at least a program to the first list; and automatically displaying the second list on a display device for confirmation by a user after each decision by the system to add at least a program to the second list.

5. The apparatus as claimed in claim 4, characterized in that, when a list is presented to the user for the purpose of confirmation, the processing unit further enables the user to modify the displayed list using entry means before the user confirms the list.

6. The apparatus as claimed in claim 4, characterized in that the processing unit further generates the first and the second lists on the basis of knowledge, present in the system, about the user's preference for certain programs.

7. An operating device for operating the apparatus as claimed in claim 4, characterized in that the operating device is provided with a separate key to enable the user to confirm choices made by the system.

\* \* \* \* \*